US012695977B2

(12) United States Patent
Lyu et al.

(10) Patent No.: US 12,695,977 B2
(45) Date of Patent: Jul. 28, 2026

(54) INFORMATION DISPLAY METHOD AND APPARATUS, ELECTRONIC DEVICE, AND STORAGE MEDIUM

(71) Applicants: Douyin Vision Co., Ltd., Beijing (CN); Lemon Inc., Grand Cayman (KY)

(72) Inventors: Guowei Lyu, Culver City, CA (US); Feng Xu, Beijing (CN); Deting Li, Culver City, CA (US)

(73) Assignees: Douyin Vision Co., Ltd., Beijing (CN); Lemon Inc., Grand Cayman (KY)

( * ) Notice: Subject to any disclaimer, the term of this patent is extended or adjusted under 35 U.S.C. 154(b) by 15 days.

(21) Appl. No.: 18/454,324

(22) Filed: Aug. 23, 2023

(65) Prior Publication Data

US 2024/0073513 A1 Feb. 29, 2024

(30) Foreign Application Priority Data

Aug. 23, 2022 (CN) .......................... 202211013961.7

(51) Int. Cl.
*H04N 23/63* (2023.01)
*G06T 11/40* (2006.01)

(52) U.S. Cl.
CPC ........... *H04N 23/632* (2023.01); *G06T 11/40* (2013.01); *G06T 2200/24* (2013.01)

(58) Field of Classification Search
CPC ...... H04N 23/632; H04N 23/60; G06T 11/40; G06T 2200/24; G06T 7/90; G06F 3/04817
See application file for complete search history.

(56) References Cited

U.S. PATENT DOCUMENTS

| | | | | |
|---|---|---|---|---|
| D1,014,536 S | * | 2/2024 | Sheen ......................... | D14/485 |
| 12,170,835 B2 | | 12/2024 | Wang et al. | |
| 2006/0170649 A1 | * | 8/2006 | Kosugi .................. | G06F 1/163 |
| | | | | 348/E5.026 |
| 2020/0307255 A1 | | 10/2020 | Takai et al. | |
| 2022/0392130 A1 | | 12/2022 | Sun et al. | |

FOREIGN PATENT DOCUMENTS

| | | |
|---|---|---|
| CN | 109508128 A | 3/2019 |
| CN | 306256211 S | 12/2020 |
| CN | 112181572 A | 1/2021 |

(Continued)

OTHER PUBLICATIONS

International Search Report and Written Opinion dated Nov. 20, 2023 in International Application No. PCT/CN2023/113213, with English Translation (18 pages).

(Continued)

*Primary Examiner* — Yogesh K Aggarwal

(57) ABSTRACT

Provided are an information display method and apparatus, an electronic device, and a storage medium. The method includes: in response to a effect adding condition being satisfied, filling a effect present image into a first display region of a shooting control; and determining target display information of a second display region on the shooting control according to the effect present image, and displaying the second display region according to the target display information; where the first display region is different from the second display region, and the second display region surrounds the first display region.

17 Claims, 6 Drawing Sheets

(56) References Cited

FOREIGN PATENT DOCUMENTS

| | | | |
|---|---|---|---|
| CN | 112702531 | A | 4/2021 |
| CN | 307150843 | S | 3/2022 |
| CN | 114415906 | A | 4/2022 |
| CN | 113727017 | B | 7/2022 |
| JP | 2020-160895 | A | 10/2020 |
| WO | 2021/129640 | A1 | 7/2021 |
| WO | 2021/170013 | A1 | 9/2021 |

OTHER PUBLICATIONS

European Search Report for EP Patent Application No. 23856507.1, Issued on Sep. 9, 2025, 9 pages.
Office action received from Japanese patent application No. 2025-511635 mailed on Jul. 15, 2025, 10 pages (5 pages English Translation and 5 pages Original Copy).
"Select colors using the Palette API," Views, Android Developers, available at https://developer.android.ui/views/graphics/palette-colors?hl=zh-cn (No Date).
"Colorkit makes it easy to find the dominant colors of an image," iOS Example, available at https://iosexample.com/colorkit-makes-it-easy-to-find-the-dominant-colors-of-an-image/ (7 pages) (No Date).
Office action received from Chinese patent application No. 202211013961.7 mailed on Mar. 24, 2026, 14 pages (7 pages English Translation and 7 pages Original Copy).
Office action received from IN patent application No. 202527015930 mailed on May 8, 2026, 8 pages.

* cited by examiner

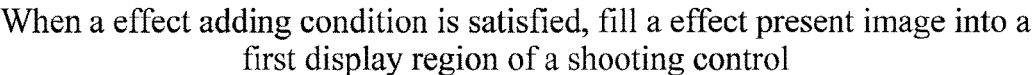

| | |
|---|---|
| When a effect adding condition is satisfied, fill a effect present image into a first display region of a shooting control | S110 |
| Determine target display information of the second display region on the shooting control according to the effect present image, and display the second display region according to the target display information | S120 |

FIG. 1

Second display region

First display region

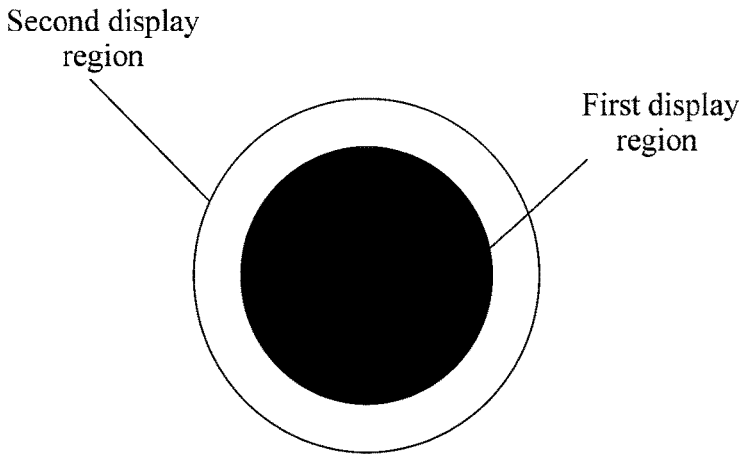

FIG. 2

Second display region

First display region

Blue

Green

Red

Yellow

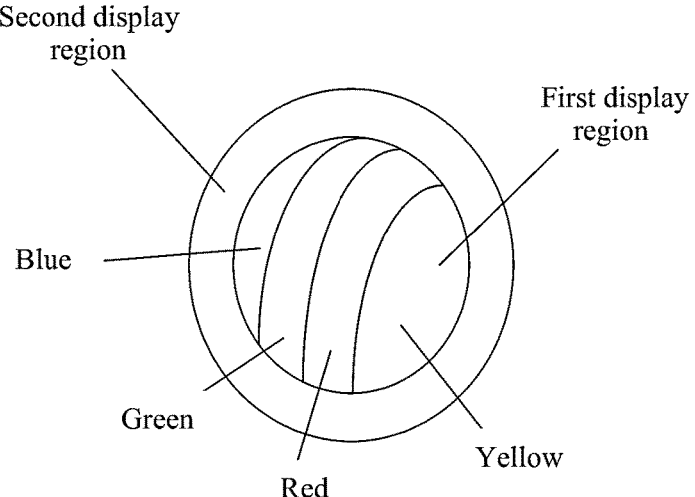

FIG. 3

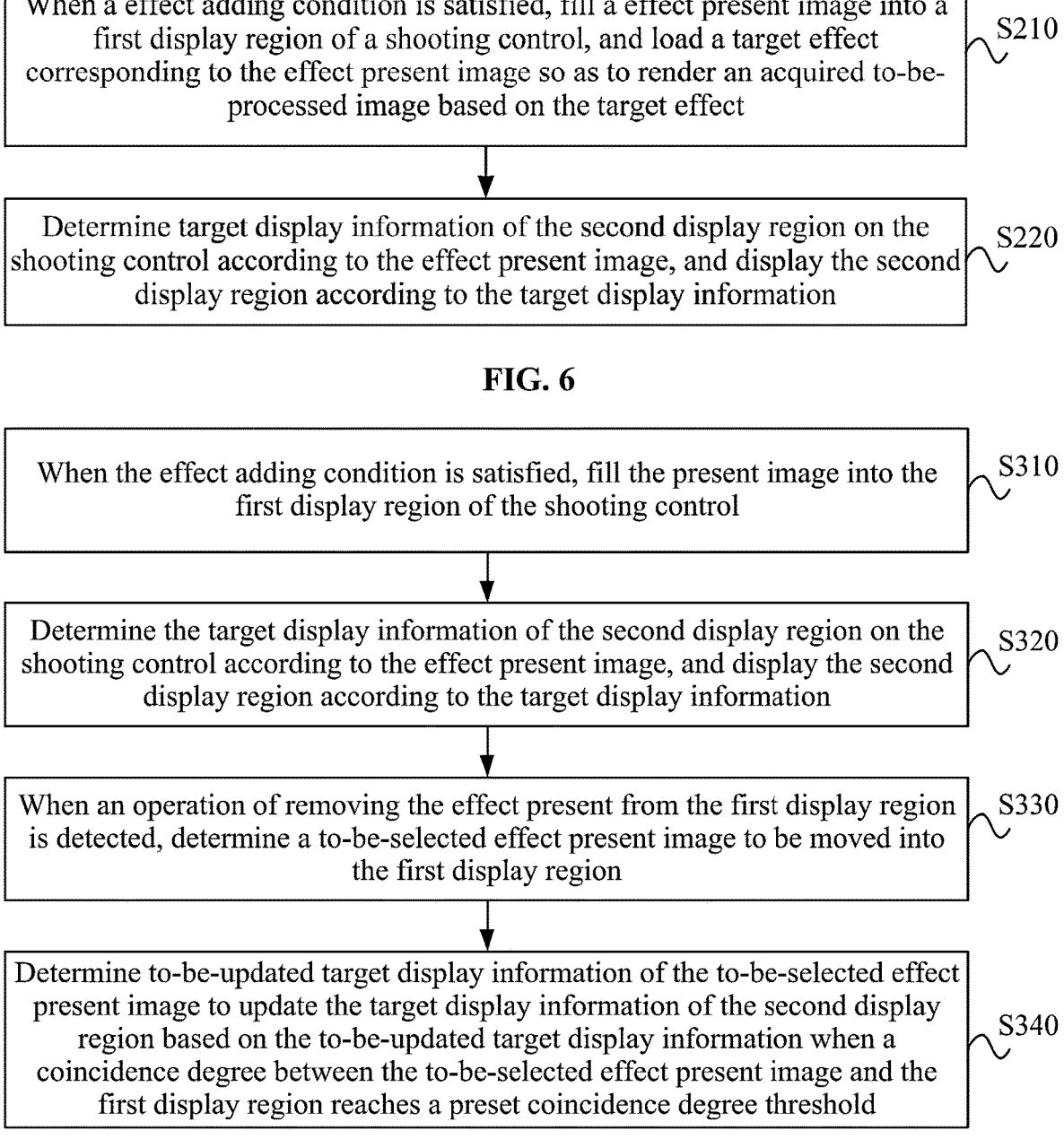

When a effect adding condition is satisfied, fill a effect present image into a first display region of a shooting control, and load a target effect corresponding to the effect present image so as to render an acquired to-be-processed image based on the target effect — S210

Determine target display information of the second display region on the shooting control according to the effect present image, and display the second display region according to the target display information — S220

FIG. 6

When the effect adding condition is satisfied, fill the present image into the first display region of the shooting control — S310

Determine the target display information of the second display region on the shooting control according to the effect present image, and display the second display region according to the target display information — S320

When an operation of removing the effect present from the first display region is detected, determine a to-be-selected effect present image to be moved into the first display region — S330

Determine to-be-updated target display information of the to-be-selected effect present image to update the target display information of the second display region based on the to-be-updated target display information when a coincidence degree between the to-be-selected effect present image and the first display region reaches a preset coincidence degree threshold — S340

FIG. 7

Element A"    Element A'       Element A

INFORMATION DISPLAY METHOD AND APPARATUS, ELECTRONIC DEVICE, AND STORAGE MEDIUM

CROSS REFERENCE TO RELATED APPLICATIONS

This application claims priority to Chinese patent application No. 202211013961.7 filed with the CNIPA on Aug. 23, 2022, the disclosure of which is incorporated herein by reference in its entirety.

TECHNICAL FIELD

The present disclosure relates to the field of image processing technology and, in particular, to an information display method and apparatus, an electronic device, and a storage medium.

BACKGROUND

With the development of network technology, more and more applications have entered the lives of users, in particular, a series of software that can shoot short videos, which are popular with users.

In related art, when a effect video is shot or a effect video is generated based on the application software, a shooting control is displayed on a display interface, and the shooting control is displayed in an original display form. The disadvantage of this manner is that the shooting control is not in harmony with the display content in the display interface, which leads to the poor present effect of the final generated effect video.

SUMMARY

The present disclosure provides an information display method and apparatus, an electronic device and a storage medium, so as to be able to adjust display information of the shooting control based on the effect present image when the effect adding condition is satisfied, thereby achieving an effect of integrating a rendering picture of the shooting control.

An embodiment of the present disclosure provides an information display method. The method includes steps described below.

When an effect adding condition is satisfied, an effect present image is filled into a first display region of a shooting control.

Target display information of a second display region on the shooting control is determined according to the effect present image, and the second display region is displayed according to the target display information.

The first display region is different from the second display region, and the second display region surrounds the first display region.

An embodiment of the present disclosure further provides an information display apparatus. The apparatus includes a first filling module and a second filling module.

The first filling module is configured to fill, when effect adding condition is satisfied, a effect present image into a first display region of a shooting control.

The second filling module is configured to determine target display information of a second display region on the shooting control according to the effect present image, and display the second display region according to the target display information.

The first display region is different from the second display region, and the second display region surrounds the first display region.

An embodiment of the present disclosure provides an electronic device. The electronic device includes one or more processors; and a storage apparatus configured to store one or more programs.

The one or more processors are configured to perform the information display method of any embodiment of the present disclosure when executing the one or more programs.

In a fourth aspect, an embodiment of the present disclosure provides a storage medium having computer-executable instructions which, when executed by a computer processor, cause the processor to perform the information display method of any embodiment of the present disclosure.

According to the technical solution of the embodiment of the present disclosure, when the effect adding condition is satisfied, the effect present image is filled into the first display region of the shooting control, and the target display information of the second display region on the shooting control is determined according to the effect present image, and the second display region is displayed according to the target display information, thereby solving a problem that when the target effect is added to a to-be-processed image in related art, the shooting control does not fit the target effect, which causes the poor display effect of the display picture, and achieving that when it is detected that the effect adding condition is satisfied, the display information of the shooting control can be adjusted based on the effect present image, the display effects of the first display region and the second display region of the shooting control are more coordinated, thus achieving an effect of integrating a rendering picture of the shooting control.

BRIEF DESCRIPTION OF DRAWINGS

The above and other features, advantages, and aspects of embodiments of the present disclosure will become more apparent with reference to the specific implementations hereinafter in conjunction with drawings. The same or similar reference numerals throughout the drawings denote the same or similar elements. It is to be understood that the drawings are illustrative and that originals and elements are not necessarily drawn to scale.

FIG. 1 is a flowchart of an information display method according to an embodiment of the present disclosure;

FIG. 2 is a schematic diagram of a shooting control according to an embodiment of the present disclosure;

FIG. 3 is a schematic diagram of a shooting control according to an embodiment of the present disclosure;

FIG. 6 is a flowchart of an information display method according to an embodiment of the present disclosure;

FIG. 7 is a flowchart of an information display method according to an embodiment of the present disclosure;

DETAILED DESCRIPTION

Figure 4:
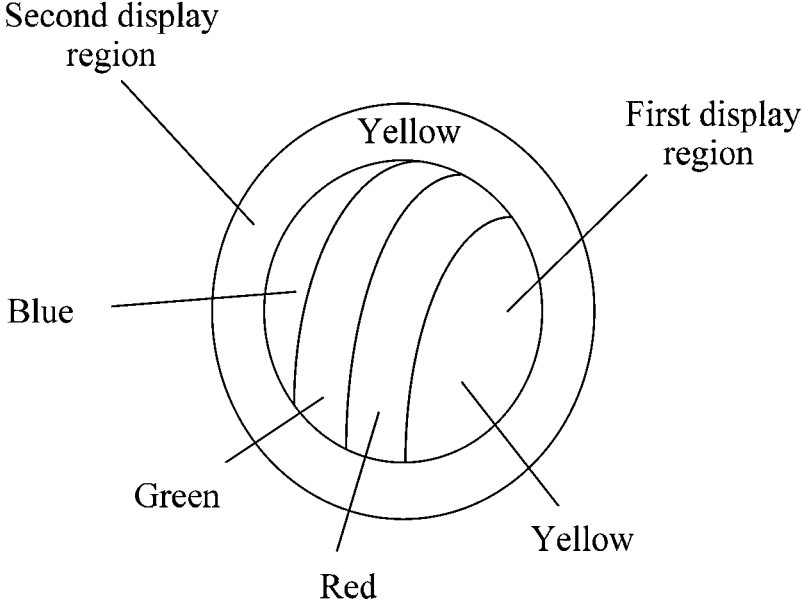
FIG. 4 is a schematic diagram of a shooting control according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that drawings and embodiments of the present disclosure are merely illustrative and are not intended to limit the scope of the present disclosure.

It is to be understood that the various steps recorded in the method embodiments of the present disclosure may be performed in a different order, and/or in parallel. Additionally, the method embodiments may include additional steps and/or omit the steps shown. The scope of the present disclosure is not limited in this respect.

The term "includes" or its variant used herein means "includes, but is not limited to". The term "based on" used herein means "at least partially based on". The term "an embodiment" used herein means "at least one embodiment". The term "another embodiment" used herein means "at least another embodiment". The term "some embodiments" used herein means "at least some embodiments". Related definitions of other terms are given in the description hereinafter.

It is to be noted that concepts such as "first" and "second" used herein are intended to distinguish between apparatuses, modules or units and not to limit the order of or dependency between functions performed by the apparatuses, modules or units.

It is to be noted that "one" or "multiple" in the present disclosure is illustrative and non-limiting and that those skilled in the art should understand that "one" or "multiple" is interpreted as "one or more" unless otherwise specified in the context.

The names of messages or information exchanged between apparatuses in embodiments of the present disclosure are illustrative and not to limit the scope of the messages or information.

It is to be understood that before using technical solutions disclosed in various embodiments of the present disclosure, a user should be notified of the type, scope of use, use scene and the like of personal information involved in the present disclosure and authorization from the user should be acquired in an appropriate manner according to relevant laws and regulations.

For example, in response to receiving an active request from a user, prompt information is sent to the user to explicitly remind the user that the requested operation requires acquisition and use of personal information of the user. Accordingly, the user can autonomously choose, according to the prompt information, whether to provide personal information for software or hardware, such as an electronic device, an application program, a server, or a storage medium, for executing operations of solutions of the present disclosure.

In an alternative but non-limiting implementation, in response to receiving the active request from the user, the manner in which the prompt information is sent to the user may be, for example, in the form of a pop-up window in which the prompt information may be presented in text. Additionally, the pop-up window may also carry a selection control for the user to select "agree" or "disagree" to determine whether to provide personal information for the electronic device.

It is to be understood that the preceding process of notifying the user and getting authorization from the user is illustrative and does not limit embodiments of the present disclosure and that other manners complying with relevant laws and regulations may also be applied to embodiments of the present disclosure.

It is to be understood that data (including, but not limited to, the data itself and acquisition or use of the data) involved in the solutions should comply with corresponding laws and regulations and relevant provisions.

Before the solutions are described, the application scenarios may be described illustratively. The technical solutions of the embodiments of the present disclosure may be applied to any scene for needing to generate the effect video. For example, in the process of shooting images or videos based on related applications or application software, a effect present image of a middle region of the shooting control is determined based on a trigger operation of the user, the display effect of the shooting control is determined based on the effect present image. Further, a to-be-processed image in the display interface is rendered based on the target effect corresponding to the effect present image, thereby generating a effect image in which the shooting control is fused with the rendering picture and presenting the effect image in the display interface.

FIG. 1 is a flowchart of an information display method according to an embodiment of the present disclosure. The embodiment of the present disclosure is applicable to a case of processing a to-be-processed image based on the application software so as to fuse the shooting control in the display interface and the rendered to-be-processed image. The method may be executed by an information display apparatus, the apparatus may be implemented in the form of software and/or hardware and, In an exemplary embodiment, by an electronic device, and the electronic device may be a mobile terminal, a person computer (PC) terminal or a server, etc.

As shown in FIG. 1, the method includes the steps below.

In S110, when a effect adding condition is satisfied, a effect present image is filled into a first display region of a shooting control.

The apparatus for executing the method for generating the effect video provided in the embodiment of the present disclosure may be integrated in application software supporting effect video processing functions, and the software may be installed in an electronic device, which, In an exemplary embodiment, may be a mobile terminal or a PC terminal, etc. This application software may be image or video processing software. Examples of this software are not enumerated here as long as this software can implement image or video processing. The application software may also be a specially-developed application program for implementation of adding effects and presenting effects, or may be integrated into a corresponding page, and a user can achieve processing of the effect video through the integrated page in the PC terminal.

In the embodiment, in the application software or the application program supporting the effect video processing function, a control for triggering the effect may be pre-developed, and when it is detected that the user triggers the control, the control may respond to the effect triggering operation, thereby filling the effect present image into the first display region of the shooting control.

The effect present image may be a effect preview image of a target effect selected by the user, or may also be a preview image stored in a specific database and in accordance with the effect display effect selected by the user. The shooting control may be a pre-developed key for implementing a shooting function. In practical application, when it is detected that the user triggers the control, the image displayed in the current display interface may be shot. The first display region is a central circular surface region of the shooting control. Exemplarily, FIG. 2 is a shooting control, and a region filled in the middle by black is the first display region.

In practical application, generally, the effect present image may be filled into the first display region of the shooting control in a case of satisfying certain effect adding conditions, and the effect adding conditions may include at least one of the followings: the shooting control being triggered, the effect present image on a display interface being triggered, present duration of a to-be-processed image reaching preset present duration, or a present gesture of a target portion of a target object being consistent with a preset present gesture.

In the embodiment, when the user triggers the shooting control, the effect adding condition may be satisfied, thus filling the effect present image into the first display region of the shooting control. Alternatively, a control for triggering a effect prop may be preset, when the user triggers the control, a display page of the effect present image may be popped up on the display interface. When the user triggering any one of the effect present images on this page, the effect adding condition may be satisfied, and this effect present image may be filled into the first display region of the shooting control. In one implementation manner, the user may shoot a video or an image in real time based on the camera apparatus of the mobile terminal, or actively upload an image based on a control pre-developed in the application software, therefore, it can be understood that the acquired real-time shot image or the image actively uploaded by the user is a to-be-processed image, and in practical application, when it is detected that the user triggers the shooting control, the terminal device may face the user in real time to acquire the image, and take the acquired image as the to-be-processed image. Meanwhile, after the to-be-processed image is acquired, the image present countdown may be displayed on the display interface, and the countdown time is a preset present duration, when the present duration of the to-be-processed image reaches a preset present duration, that is, the image present countdown returns to zero, it can be explained that the effect adding condition is satisfied. In another implementation manner, some present gestures may be set in advance as effect triggering actions, and when it is detected that a present gesture of the target portion of the target object within the field of view are consistent with a preset set present gestures, it may be explained that the effect adding condition is satisfied. In an exemplary embodiment, the target object may be a user, an animal or the like. The target portion may be at least one limb portion associated with the target object. It should be understood by those skilled in the art that the specific event selected as the effect adding condition can be set according to the actual situation, and the embodiment of the present disclosure are not specifically limited herein.

In practical application, when it is detected that the effect adding condition is satisfied, the effect present image is determined, so that the effect present image can be filled into the first display region of the shooting control.

In an exemplary embodiment, filling the effect present image into the first display region of the shooting control includes updating an original image of the first display region in the shooting control based on the effect present image.

In the embodiment, the original image of the first display region may be a preset display image without any processing. Exemplarily, as shown in FIG. 2, the image corresponding to the middle black region is the original image of the first display region.

In practical application, after the effect present image is determined, the effect present image is moved to the first display region of the shooting control through the triggering operation, so that the effect present image updates the original image of the first display region. In an exemplary embodiment, the triggering operation may include at least one of sliding, clicking, or pressing. This arrangement has the advantage that the display information of the shooting control can be adjusted based on the effect present image, thereby achieving the effect of integrating the shooting control and the rendering picture.

In S120, target display information of the second display region on the shooting control is determined according to the effect present image, and the second display region is displayed according to the target display information.

It should be noted that S110 and S120 do not have a timing execution relationship, and the two steps may be executed in parallel.

The first display region is different from the second display region, and the second display region surrounds the first display region. The first display region is a circular ring region surrounding the first display region. Exemplarily, as shown in FIG. 2, the circular ring region outside the first display region is the second display region. In the embodiment, the target display information may be image display information in which the second display region is updated.

In practical application, after the effect present image is filled into the first display region of the shooting control, since the first display region and the second display region belong to the shooting control, in order to make the overall effect display effect of the shooting control more complete, the target display information of the second display region may be determined according to the effect present image in the first display region.

In an exemplary embodiment, determining the target display information of the second display region on the shooting control according to the effect present image includes determining the target display information of the second display region on the shooting control according to at least one color region in the effect present image.

In the embodiment, the color regions may be regions occupied by various colors included in the effect present image. Exemplarily, as shown in FIG. 3, when the effect present image is an image composed of blue, green, red, and yellow, its corresponding color regions are a blue region, a green region, a red region, and a yellow region.

In practical application, when the effect present image is updated to the first display region of the shooting control, the color region in the effect present image may be recognized based on a image color recognition algorithm, so that the target display information of the second display region may be determined based on the color recognition result. This arrangement has the advantage that the display effect of the first display region and the second display region of the shooting control can be more coordinated, thereby improving the overall display effect of the shooting control.

It is to be noted that the number of color regions in the effect present image may be one or more. When there is only one color region, the target display information in the second display region may include only one kind of color information. When there are multiple color regions, the color regions may be screened according to a preset screening rule to obtain target display information.

In practical application, the effect present image is a preview image of the target effect corresponding to the effect present image. When the effect present image is updated to the first display region of the shooting control, the target effect corresponding to the effect present image may be transferred and loaded at the same time, so that the target effect renders the to-be-processed image in the display interface. Therefore, when the target display information of the second display region is determined, the target display information can be determined not only according to the color regions of the effect present image, but also in combination with the display situation of the target effect corresponding to the effect present image.

In an exemplary embodiment, determining the target display information of the second display region on the shooting control according to the effect present image includes determining the target display information according to the effect present image and the load state of the target effect corresponding to the effect present image.

In the embodiment, the target effect may be a effect that is finally rendered onto the to-be-processed image. In practical application, the correspondence between the target effect and the effect present image may be pre-constructed, when the effect present image is updated into the first display region of the shooting control, the target effect corresponding to the effect present image may be loaded, and the target display information of the second display region is determined according to the color region information in the effect present image and the load state of the target effect. This arrangement has the advantage that the dynamic present effect can be presented, thereby enhancing the richness and interest of the display effect of the shooting control.

It is to be noted that the load state of the target effect may include a load completion state and a loading state, so that the determination manner of the target display information may be separately determined according to different load states of the target effect. The determination manner of the target display information may be described in detail below.

In an exemplary embodiment, when the load state is the load completion state, determining the target display information according to the effect present image and the load state of the target effect includes taking color information corresponding to a largest color region as the target display information.

In practical application, when the load state of the target effect is the loaded completion state, areas of various color regions corresponding to the effect present image may be determined based on the image color recognition algorithm, and further, the areas of various color regions are compared and the color information corresponding to the color region with the largest region area is determined, so that the color information corresponding to the color region with the largest region area may be taken as the target display information of the second display region. This arrangement has the advantage that the overall display effect of the shooting control can be made more complete, thereby improving the effect display effect of the display interface.

Exemplarily, as shown in FIG. 4, the color region corresponding to the effect present image includes a blue region, a green region, a red region, and a yellow region. Among the four regions, the area corresponding to the yellow region is the largest, therefore, yellow may be taken as the target display information of the second display region.

In an exemplary embodiment, when the load state is the loading state, determining the target display information according to the effect present image and the load state of the target effect includes: taking color information corresponding to a largest color region of the at least one color region as first display information; taking color information corresponding to a second largest color region of the at least one color region as dynamic display information in the second display region; and determining the target display information based on the first display information and the dynamic display information so as to fill the second display region based on the first display information, and taking the dynamic display information as a scroll bar to traverse in the second display region.

It is to be noted that in order to reduce the memory occupation rate of the application software in the terminal device, for various to-be-selected effects stored in the application software in advance, only a part of the to-be-selected effects may be loaded; and for the to-be-selected effects not loaded, the real-time loading may be performed in the actual application process. At this moment, the target effect may require a certain loaded time due to the current network state or the current terminal device state.

It is to be further noted that in the application software, all the to-be-selected effect present images used for performing effect preview on the to-be-selected effects are pre-loaded. Therefore, in the loaded process of the target effect, the display information of the shooting control can be adjusted based on the effect present image in advance.

In the embodiment, the dynamic display information may be display information dynamically changed in the second display region. In practical application, for a part of target effects which are not pre-loaded, when the effect present image is updated to the first display region, the corresponding target effect may be loaded. Since the loaded process of the target effects needs a certain time, in order to reflect the load state of the target effects, the region areas of various color regions in the effect present image may be first determined, and the color information corresponding to the largest region area may be taken as the first display information. At the same time, the color information corresponding to the second largest region area may be taken as the dynamic display information, and the first display information may be further updated to the second display region. In an example, the dynamic display information may be taken as a scroll bar to circularly traverse the second display region. At this moment, the target display information includes both the first display information and the dynamic display information. When the target effects are loaded completely, the dynamic display information may disappear, and at this moment, the target display information is the first display information. This arrangement has the advantage that the load state of the target effects can be dynamically displayed, the overall display effect of the shooting control is improved, and the interest in the effect display effect is enhanced.

Figure 5:
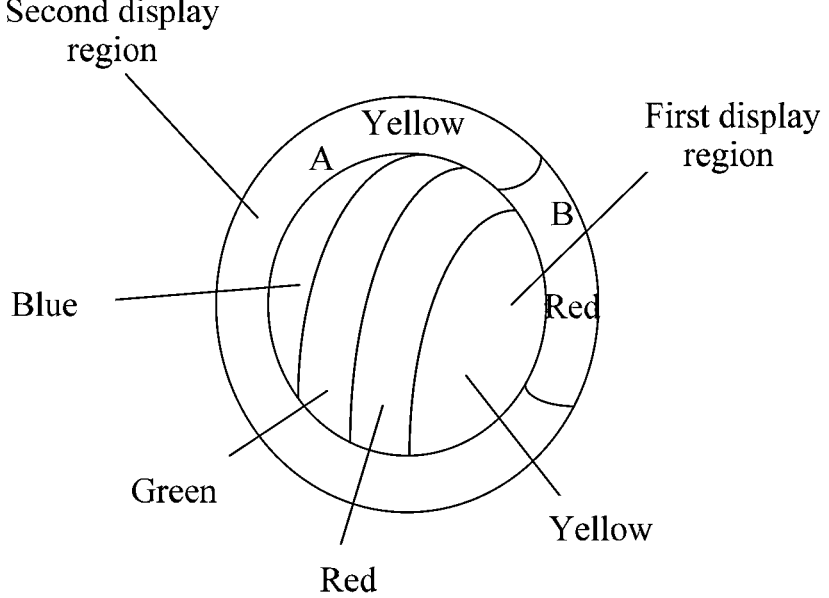
FIG. 5 is a schematic diagram of a shooting control according to an embodiment of the present disclosure.

Exemplarily, as shown in FIG. 5, the largest color region in the effect present image is the yellow area, the second largest color region is the red region. Therefore, yellow may be taken as the first display information and red may be taken as the dynamic display information, so as to determine the target display information, that is, yellow is filled into the second display region, at the same time, red is taken as the scroll bar to circularly traverse the second display region, and a region A in FIG. 5 is the scroll bar region.

It is to be noted that when the effect present image includes two or more color regions, the target display information may be determined based on the above method. However, when the number of color regions in the effect present image are smaller than two, the color information corresponding to the color region of the effect present image may be taken as the first display information, and the color information preset by the system may be taken as the dynamic display information, thereby finally determining the target display information. The color information preset by the system may be any color, and in an example, may be black or white.

It is to further be noted that the display form of the dynamic display information in the second display region is not limited to the scroll bar, but may be other dynamic display forms, as long as the display form that may characterize the load state of the effect may be taken as the display form of the dynamic display information, and the embodiment of the present disclosure does not specifically limit the display form of the dynamic display information in the second display region.

In practical application, when the target effect is in the loading state, in order to improve the overall effects of the first display region and the second display region of the shooting control, the first display region may be further processed based on the dynamic display information in the process of traversing the second display region based on the dynamic display information, so that the first display region is more coordinated with the second display region.

Based on this, on the basis of the above-mentioned technical solution, the method further includes covering the effect present image of the first display region with a mask layer corresponding to the dynamic display information according to a preset transparency.

It can be understood by those skilled in the art that the mask layer is a coverage covering a certain region, and the coverage may be in a transparent or semitransparent state. The preset transparency may be expressed as a percentage. The phase between the mask layer and the colorless transparency may be divided into 100 parts by the preset transparency. It can be understood that when the value of the preset transparency is relatively low, the effect presented by the mask layer tends to be opaque, and when the value of the preset transparency is relatively high, the effect presented by the mask layer tends to be transparent. The preset transparency may be any value, and in an example, may be 30%, 40%, 50%, or the like. In the embodiment, the mask layer may be covered on the effect present image.

It is to be noted that when the target effect is in the loading state, the rendering state of the to-be-selected image in the display interface is also in the rendering state, at this moment, in order to reflect the effect switching effect, the display interface presents an effect of being covered by the semitransparent coverage. At the same time, in order to improve the coordination degree between the display content in the display interface and the display information of the shooting control, the mask layer corresponding to the dynamic display information may be set for the effect present image in the first display region when the target effect is in the loading state.

In practical application, when the target effect is in the loading state, the mask layer corresponding to the dynamic display information may be determined while taking the dynamic display information as the scroll bar to traverse the second display region, that is, the color corresponding to the dynamic display information is taken as the color of the mask layer. In an example, the mask layer is covered on the effect present image of the first display region according to the preset transparency, so that the mask layer processing is performed on the effect present image during traversing the second display region by using the dynamic display information. This arrangement has the advantage that the overall display effect of the first display region and the second display region of the shooting control can be improved, at the same time, the coordination degree between the display contents of the display contents and the display contents in the display interface is improved.

According to the technical solution of the embodiment of the present disclosure, when the effect adding condition is satisfied, the effect present image is filled into the first display region of the shooting control, and the target display information of the second display region on the shooting control is determined according to the effect present image, and the second display region is displayed according to the target display information, thereby solving a problem that when the target effect is added to a to-be-processed image in related art, the shooting control does not fit the target effect, which causes the poor display effect of the display picture, and achieving that when it is detected that the effect adding condition is satisfied, the display information of the shooting control can be adjusted based on the effect present image, the display effects of the first display region and the second display region of the shooting control are more coordinated, thus achieving an effect of integrating a rendering picture of the shooting control.

FIG. 6 is a flowchart of an information display method according to an embodiment of the present disclosure. On the basis of the foregoing embodiments, in the process of filling the effect present image into the first display region, the target effect corresponding to the effect present image may be loaded, and the target effect may be rendered on the to-be-processed image. For the specific implementation, reference may be made to the technical solution of the embodiment. Terms identical to or similar to the preceding embodiments are not repeated here.

As shown in FIG. 6, the method includes steps described below.

In S210, when a effect adding condition is satisfied, a effect present image is filled into a first display region of a shooting control, and a target effect corresponding to the effect present image is loaded so as to render an acquired to-be-processed image based on the target effect.

It is to be noted that when the user acquires an image based on the camera apparatus of the terminal device, an image acquisition may be achieved by inputting a trigger operation to the shooting control displayed on the display interface, and the acquired image is taken as the to-be-processed image. In an example, when the effect adding condition is satisfied, the effect present image may be filled into the first display region of the shooting control, and in this process, the to-be-processed image may be added with a corresponding effect, so that the shooting control is fused with the to-be-processed image.

In the embodiment, the target effect may be a filter effect corresponding to the effect present image. In practical application, the correspondence between the to-be-selected effect present image and the to-be-selected effect may be pre-established. When the user determines the effect present image from multiple to-be-selected effect present images, the target effect corresponding to the effect present image may be transferred and loaded, so that the to-be-processed image may be rendered based on the target effect after the target effect is loaded.

It is to be noted that before the target effect corresponding to the effect present image is loaded, the effect present image may also be determined from multiple to-be-selected effect present images. In the embodiment, multiple manners in which the effect present image is determined may be provided, and a description will be given as how to determine the effect present image.

Manner one: if multiple to-be-selected effect present images are superimposed and displayed on the display interface, a to-be-selected effect present image disposed at an uppermost layer on the display interface is taken as the effect present image.

In practical application, when the user triggers the effect adding condition, multiple to-be-selected effect present images are displayed on the display interface, and those to-be-selected effect present images may be superimposed and displayed on one side of the shooting control. At this moment, the to-be-selected effect present image located at the uppermost layer of the display interface may be used as the effect present image.

Manner two: if multiple to-be-selected effect present images are tiled and displayed on the display interface, a first displayed to-be-selected effect present image is taken as the effect present image according to a first preset direction.

In the embodiment, the first preset direction may be a left-to-right sliding direction centered on the shooting control or a right-to-left sliding direction centered on the shooting control.

In practical application, when the effect adding condition is satisfied, multiple to-be-selected effect present images may be displayed on the display interface, and are tiled on both sides of the shooting control. At this moment, the first preset direction of the to-be-selected effect present images may be determined, and the first to-be-selected effect display image displayed in this direction may be taken as the effect present image.

Manner three: a triggered to-be-selected effect present image is taken as the effect present image.

In an exemplary embodiment, when multiple to-be-selected effect present images are displayed on the display interface, the user may select among the multiple to-be-selected effect present images through the trigger operation, and may issue a determination instruction based on a determination control, so that the currently selected to-be-selected effect present image may be taken as the effect present image.

It is to be noted that the advantage of determining the effect present image based on the above three manners is that the flexibility of determining solution of the effect present image can be enhanced.

In S220, target display information of the second display region on the shooting control is determined according to the effect present image, and the second display region is displayed according to the target display information.

According to the technical solution of the embodiment of the present disclosure, when the effect adding condition is satisfied, the effect present image is filled into the first display region of the shooting control, the target effect corresponding to the effect present image is loaded so as to render the acquired to-be-processed image based on the target effect, and the target display information of the second display region on the shooting control is determined according to the effect present image, and the second display region is displayed according to the target display information, thereby achieving a more fusion effect between the shooting control and the rendered to-be-processed images. At the same time, the flexibility of the processing solution of the effect image is enhanced by setting multiple effect present images, thereby improving the display effect of the rendering picture.

FIG. 7 is a flowchart of an information display method according to an embodiment of the present disclosure. On the basis of the foregoing embodiments, when the effect present image is removed from the first display region, the target display information in the second display region may be determined based on the to-be-selected effect present image moved into the first display region. For the specific implementation, reference may be made to the technical solution of the embodiment. Terms identical to or similar to the preceding embodiments are not repeated here.

As shown in FIG. 7, the method includes steps described below.

In S310, when the effect adding condition is satisfied, the effect present image is filled into the first display region of the shooting control.

In S320, the target display information of the second display region on the shooting control is determined according to the effect present image, and the second display region is displayed according to the target display information.

In S330, when an operation of removing the effect present image from the first display region is detected, a to-be-selected effect present image to be moved into the first display region is determined.

In practical application, the effect present image and the to-be-selected effect present image may be determined by translating left and right. The user may remove the effect present image from the first display region by inputting a sliding operation to the effect present image in the first display region. When the effect present image is removed from the first display region, the to-be-selected effect present image adjacent to the effect present image may be taken as the to-be-selected present image to be moved into the first display region. It is to be noted that when it is detected that the effect present image is removed from the first display region by sliding to the right, the to-be-selected effect present image adjacent to the left side of the effect present image may be taken as the to-be-selected effect present image to be moved into the first display region. When it is detected that the effect present image is removed from the first display region by sliding to the left, the to-be-selected effect present image adjacent to the right side of the effect present image may be taken as the to-be-selected effect present image to be moved into the first display region.

Figure 8:
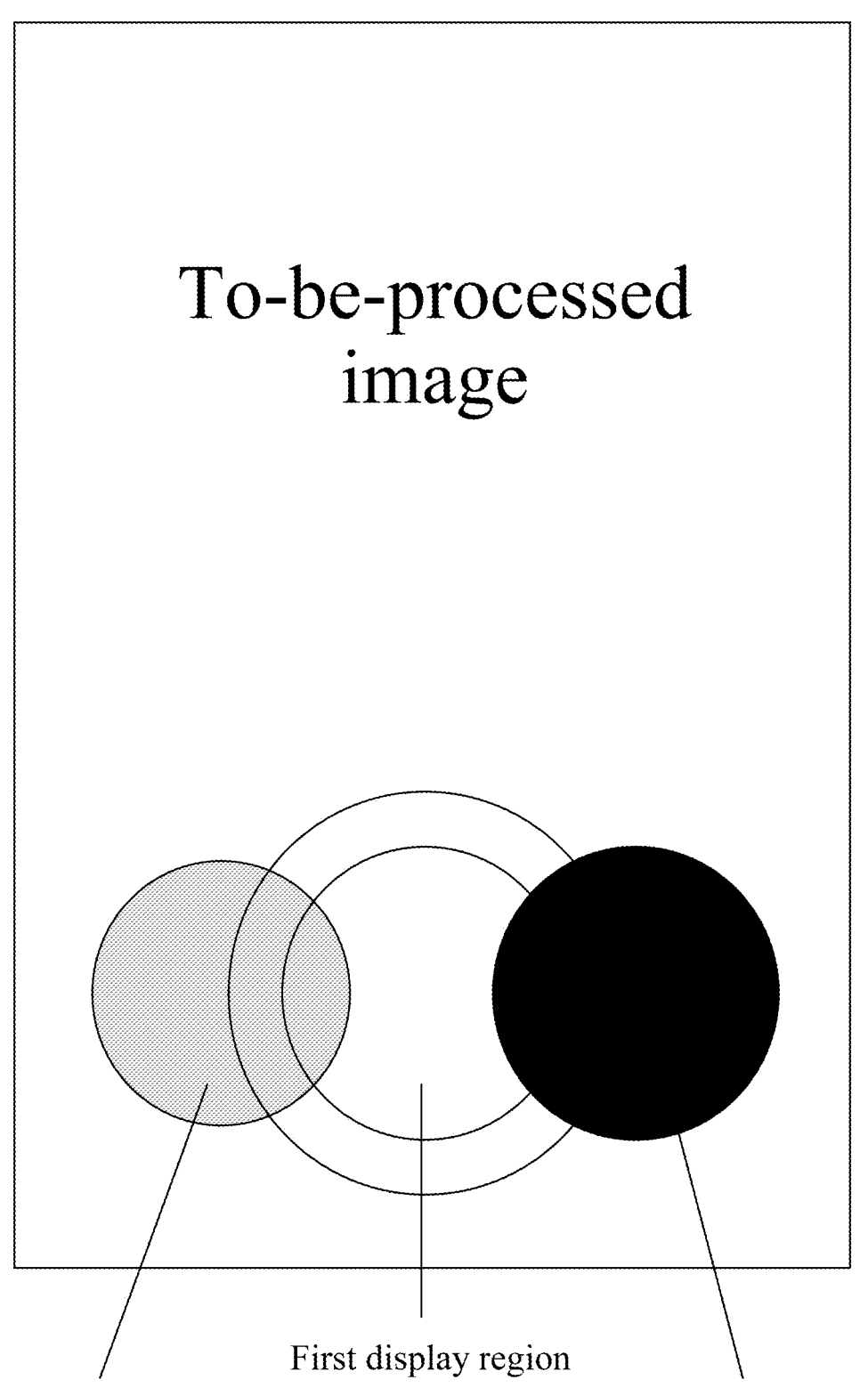
FIG. 8 is a schematic diagram of a terminal display interface according to an embodiment of the present disclosure.

Exemplarily, as shown in FIG. 8, the image corresponding to the black region in the figure may be taken as the effect present image, and the image corresponding to the fringe region may be taken as the to-be-selected effect present image. When the image corresponding to the black region is removed from the first display region by translating to the right, at the same time, the image corresponding to the fringe region adjacent to the image corresponding to the black region may be taken as a to-be-selected effect present image to be moved into the first display region.

In S340, to-be-updated target display information of the to-be-selected effect present image is determined to update the target display information of the second display region based on the to-be-updated target display information when a coincidence degree between the to-be-selected effect present image and the first display region reaches a preset coincidence degree threshold.

In the embodiment, the to-be-updated target display information may be color region information of the to-be-selected effect present image to be moved into the first display region. In practical application, when it is detected that the effect present image is removed from the first display region, the to-be-selected effect present image to be moved into the first display region is determined, and in the process of moving the to-be-selected effect present image into the first display region, the color region recognition is performed on the to-be-selected effect present image based on the image color recognition algorithm, and the color information corresponding to the largest color region and the color information corresponding to the second largest color region are taken as the to-be-updated target display information.

In the embodiment, the coincidence degree may be a coincidence area between the first display region and the to-be-selected effect present image moved into the first display region. The coincidence degree may be expressed as a percentage. The preset coincidence degree threshold may be a preset standard value for detecting whether the to-be-selected effect present image moved into the first display region is within the display range of the first display region. It is to be noted that the coincidence degree may be determined based on any manner, and in an example, may be determined by detecting the distance between the center of the to-be-selected effect present image and the center of the first display region.

In practical application, after the to-be-selected effect present image to be moved into the first display region is determined, the to-be-selected effect present image may be moved into the first display region. At the same time, the color region of the to-be-selected effect present image may be detected based on the image color recognition algorithm, so that the to-be-updated target display information can be determined. In an example, when it is detected that the coincidence degree between the to-be-selected effect present image and the first display region reaches the preset coincidence degree threshold, the target display information in the second display region may be updated based on the to-be-updated target display information.

It is to be noted that to-be-updated when the coincidence degree between the to-be-selected effect present image and the first display region does not reach the preset coincidence degree threshold, it can be explained that the effect present image is still within the detection range of the first display region. At this moment, the target display information of the second display region may be jointly determined based on the to-be-selected effect present image and the effect present image.

On the basis of the above technical solution, the method further includes: in response to the coincidence degree between the first display region and the to-be-selected effect present image not reaching the preset coincidence degree threshold, distance information between the to-be-selected effect present image and the second display region and distance information between the effect present image and the second display region are determined; and a superposition ratio between the to-be-updated target display information and the target display information is determined based on the distance information between the to-be-selected effect present image and the second display region and distance information between the effect present image and the second display region, so as to display the second display region based on superposed target display information.

In the embodiment, in the process of removing the effect present image from the first display region and moving the to-be-selected effect present image into the first display region, the distance information between the effect present image and the second display region and the distance information between the to-be-selected effect present image and the second display region may be determined based on a displacement detection algorithm, and further, the superposition ratio between the to-be-updated target display information and the target display information may be determined based on the two pieces of distance information.

In an exemplary embodiment, the distance between the center point of the effect present image and the center point of the first display region may be determined, and since the distance between the first display region and the second display region may be predetermined, the distance information between the effect present image and the second display region may be determined based on the two pieces of distance information. Another implementation may be to determine a rectangular frame based on the boundary information of the effect present image, also determine a rectangular frame based on the boundary information of the second display region at the same time, and determine the distance between the center points of the two rectangular frames, i.e., the distance information between the effect present image and the second display region. It should be understood by those skilled in the art that the specific manner selected as the determination manner of the distance information may be set according to the actual situation, and the embodiment of the present disclosure are not specifically limited herein. It is to be noted that the determination manner of the distance information between the to-be-selected effect present image and the second display region may also be determined on the basis of the above several determination manners.

In an example, if the distance between the effect present image and the second display region is greater than the distance between the to-be-selected effect present image and the second display region, the superposition ratio may be such that the percentage of the target display information is greater than the percentage of the to-be-updated target display information; and if the distance between the effect present image and the second display region is less than the distance between the to-be-selected effect present image and the second display region, the superposition ratio may be such that the percentage of the target display information is less than the percentage of the to-be-updated target display information, so that the superimposed target display information may be determined based on the superposition ratio to display the second display region based on the superimposed target display information. This arrangement has the advantage that the dynamic conversion effect between the effect present image and the to-be-selected effect present image can be reflected, thereby improving the richness and interest of the display effect of the shooting control.

In practical application, the to-be-selected effect present images may be displayed on both sides of the shooting control. When multiple to-be-selected effect present images are displayed on both sides of the shooting control at the same time, the occupation space in the display interface is relatively large, thereby affecting the effect display effect.

On the basis of the above-described technical solution, the method further includes: in a case where multiple to-be-selected effect present images are provided, successively reducing display sizes of the multiple to-be-selected effect present images on both sides of the effect present image with the effect present image in the first display region as a center, and stacking and displaying the multiple to-be-selected effect present images.

In the embodiment, the display size of the to-be-selected effect present image may be an image display area. In practical application, various to-be-selected effect present images are stacked and displayed, the depth information of each of the various to-be-selected effect present images may be determined, and the smaller the depth value of a to-be-selected effect present image is, the larger the display size of the to-be-selected effect present image is. In the process of arranging the various to-be-selected effect present images, the to-be-selected effect present image with the smaller depth value may be arranged in the first place, and partial regions of the adjacent to-be-selected effect present image are shielded, thereby achieving the effect of stacking and displaying.

In practical application, when multiple to-be-selected effect present images are displayed on the display interface, the display size of the effect present image currently displayed in the first display region may be taken as the original display size. In an example, on the basis of the original display size, the display sizes of the to-be-selected effect present images located at both sides of the effect present image are successively reduced, and the various to-be-selected effect present images are stacked and displayed. This arrangement has the advantages that the arrangement relationship among the multiple to-be-selected effect present images can be made more reasonable, the occupation space of the to-be-selected effect present images in the display interface can be reduced, and the multiple to-be-selected effect present images can be made to form a perspective effect in space, thereby improving the effect present effect of the shooting control.

Figure 9:
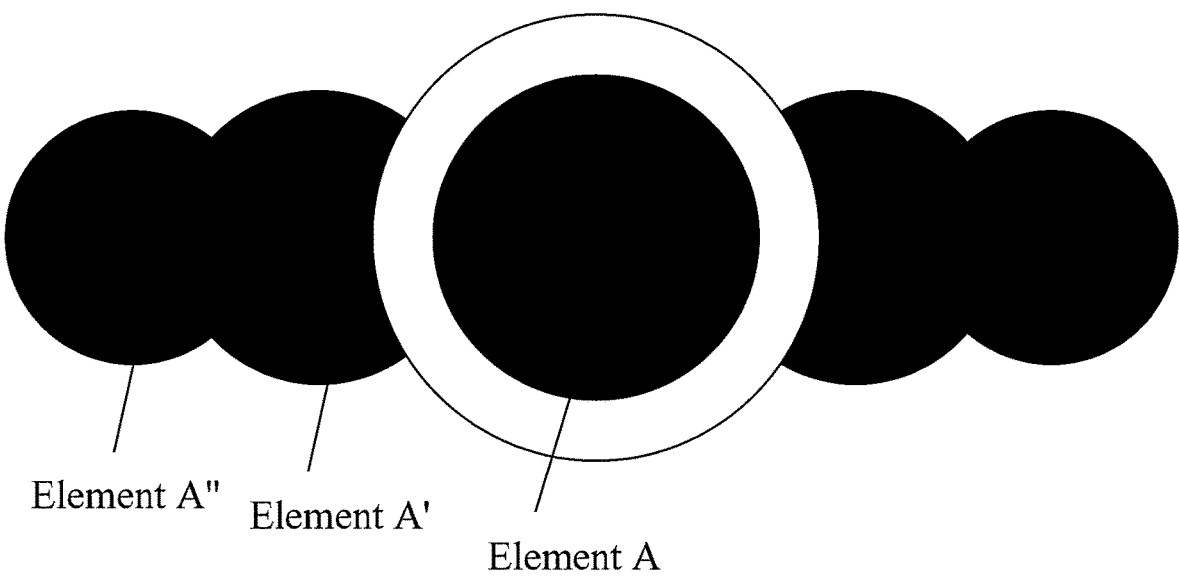
FIG. 9 is a schematic diagram of an arrangement manner of a shooting control according to an embodiment of the present disclosure.

Exemplarily, as shown in FIG. 9, an element A may be taken as the effect present image, and its display size is set to be C, and an element A' and an element A" are to-be-selected effect present images, where the display sizes of the element A' and the element A" are smaller than that of the element A. The display size of the element A' may be set to be C*n %, and the display size of the element A" is set to be C*n %*m %, at the same time, the display size of the element A' and the element A" may be further reduced by cutting part of the shape of the element A' and part of the shape of the element A", thereby achieving a stacked display effect.

It is to be noted that when the to-be-selected effect present image is moved into the first display region, its corresponding display sizes may be supplemented, so that the effect present image in the first display region always maintains the original display size. Exemplarily, as shown in FIG. 9, when the element A' is moved to the position where the element A is located, the display size of the element A' is supplemented to C; and when the element A" is moved to the position where the element A' is located, the display size corresponding to the element A" is supplemented and corrected to the display size of the element A'.

According to the technical solution of the embodiment of the present disclosure, when the effect adding condition is satisfied, the effect present image is filled into the first display region of the shooting control, and the target display information of the second display region on the shooting control is determined according to the effect present image, and the second display region is displayed according to the target display information. Further, when the operation of removing the effect present from the first display region is detected, a to-be-selected effect present image to be moved into the first display region is determined, and finally, the to-be-updated target display information of the to-be-selected effect present image is determined to update the target display information of the second display region based on the to-be-updated target display information when a coincidence degree between the to-be-selected effect present image and the first display region reaches a preset coincidence degree threshold. So that the effect of dynamically switching the effect present image and the to-be-selected effect present image is achieved, and the richness and interest of the present effect of the shooting control are improved, thereby improving the present effect of the effect rendering picture.

Figure 10:
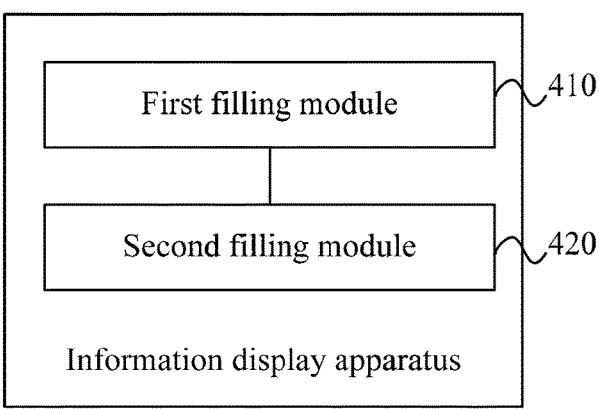
FIG. 10 is a structure diagram of an information display apparatus according to an embodiment of the present disclosure.

FIG. 10 is a structure diagram of an information display apparatus according to an embodiment of the present disclosure. As shown in FIG. 10, the apparatus includes a first filling module 410 and a second filling module 420.

The first filling module 410 is configured to fill, when a effect adding condition is satisfied, a effect present image into a first display region of a shooting control.

The second filling module 420 is configured to determine target display information of a second display region on the shooting control according to the effect present image, and display the second display region according to the target display information.

The first display region is different from the second display region, and the second display region surrounds the first display region.

On the basis of the above technical solutions, the effect adding condition includes at least one of: the shooting control being triggered; the effect present image on a display interface being triggered; present duration of a to-be-processed image reaching preset present duration; or a present gesture of a target portion of a target object being consistent with a preset present gesture.

On the basis of the above technical solutions, the apparatus further includes a target effect load module.

The target effect load module is configured to load, in a process of filling the effect present image into the first display region of the shooting control, a target effect corresponding to the effect present image so as to render an acquired to-be-processed image based on the target effect.

On the basis of the preceding technical solutions, the apparatus further includes a first effect present image determination module, a second effect present image determination module and a third effect present image determination module.

The first effect present image determination module is configured to take, before loading the target effect corresponding to the effect present image, a to-be-selected effect present image disposed at an uppermost layer on the display interface as the effect present image in response to multiple to-be-selected effect present images being superimposed and displayed on the display interface; or the second effect present image determination module is configured to take, in response to the multiple to-be-selected effect present images being tiled and displayed on the display interface, a first displayed to-be-selected effect present image as the effect present image according to a first preset direction; or the third effect present image determination module is configured to take a triggered to-be-selected effect present image of the plurality of to-be-selected effect present images as the effect present image.

On the basis of the above technical solutions, the first filling module 410 is specifically configured to update an original image of the first display region in the shooting control based on the effect present image.

On the basis of the above technical solutions, the second filling module 420 includes a target display image determination sub-module.

The target display image determination sub-module is configured to determine the target display information of the second display region on the shooting control according to at least one color region in the effect present image.

On the basis of the above technical solutions, the target display image determination sub-module includes a target display image determination unit.

The target display image determination unit is configured to determine the target display information according to the effect present image and a load state of a target effect corresponding to the effect present image.

On the basis of the above technical solutions, the target display image determination unit is specifically configured to take color information corresponding to the largest color region of the at least one color region as the target display information.

On the basis of the above technical solutions, the target display image determination unit includes a first display information determination subunit, a dynamic display information determination subunit, and a target display information determination subunit.

The first display information determination subunit is configured to take color information corresponding to the largest color region of the at least one color region as first display information.

The dynamic display information determination subunit is configured to take color information corresponding to the second largest color region of the at least one color region as dynamic display information in the second display region.

The target display information determination subunit is configured to determine the target display information based on the first display information and the dynamic display information so as to fill the second display region based on the first display information and take the dynamic display information as a scroll bar to traverse the second display region.

On the basis of the above technical solutions, the apparatus further includes a mask layer coverage module.

The mask layer coverage module is configured to cover the effect present image of the first display region with a mask layer corresponding to the dynamic display information according to a preset transparency.

On the basis of the preceding technical solutions, the apparatus further includes a to-be-selected effect present image determination module and a to-be-updated target display information determination module.

The to-be-selected effect present image determination module is configured to determine, when an operation of removing the effect present image from the first display region is detected, a to-be-selected effect present image to be moved into the first display region.

The to-be-updated target display information determination module is configured to determine to-be-updated target display information of the to-be-selected effect present image, so as to update the target display information of the second display region based on the to-be-updated target display information when a coincidence degree between the to-be-selected effect present image and the first display region reaches a preset coincidence degree threshold.

On the basis of the above technical solutions, the apparatus further includes a distance information determination module and a superposition ratio determination module.

The distance information determination module is configured to determine, when the coincidence degree between the first display region and the to-be-selected effect present image does not reach the preset coincidence degree threshold, distance information between the to-be-selected effect present image and the second display region and distance information between the effect present image and the second display region.

The superposition ratio determination module is configured to determine a superposition ratio between the to-be-updated target display information and the target display information based on the distance information between the to-be-selected effect present image and the second display region and distance information between the effect present image and the second display region, so as to display the second display region based on superposed target display information.

On the basis of the above technical solutions, the apparatus further includes a to-be-selected effect present image display module.

The to-be-selected effect present image display module is configured to successively reduce, in a case where multiple to-be-selected effect present images are provided, display sizes of the multiple to-be-selected effect present images on both sides of the effect present image with the effect present image in the first display region as a center, and stack and display the multiple to-be-selected effect present images.

On the basis of the above technical solutions, the first display region is a central circular surface region of the shooting control, and the second display region is a circular ring region surrounding the first display region.

According to the technical solution of the embodiment of the present disclosure, when the effect adding condition is satisfied, the effect present image is filled into the first display region of the shooting control and the target display information of the second display region on the shooting control is determined according to the effect present image, and the second display region is displayed according to the target display information, thereby solving a problem that when the target effect is added to a to-be-processed image in related art, the shooting control does not fit the target effect, which causes the poor display effect of the display picture, and achieving that when it is detected that the effect adding condition is satisfied, the display information of the shooting control can be adjusted based on the effect present image, the display effects of the first display region and the second display region of the shooting control are more coordinated, thus achieving an effect of integrating a rendering picture of the shooting control.

The information display apparatus of the embodiment of the present disclosure may perform the information display method of any embodiment of the present disclosure and has function modules and beneficial effects corresponding to the performed method.

It is to be noted that units and modules included in the preceding apparatus are divided according to function logic but are not limited to such division, as long as the corresponding functions can be achieved. Moreover, the specific names of function units are used for distinguishing between each other and not intended to limit the scope of the embodiments of the present disclosure.

Figure 11:
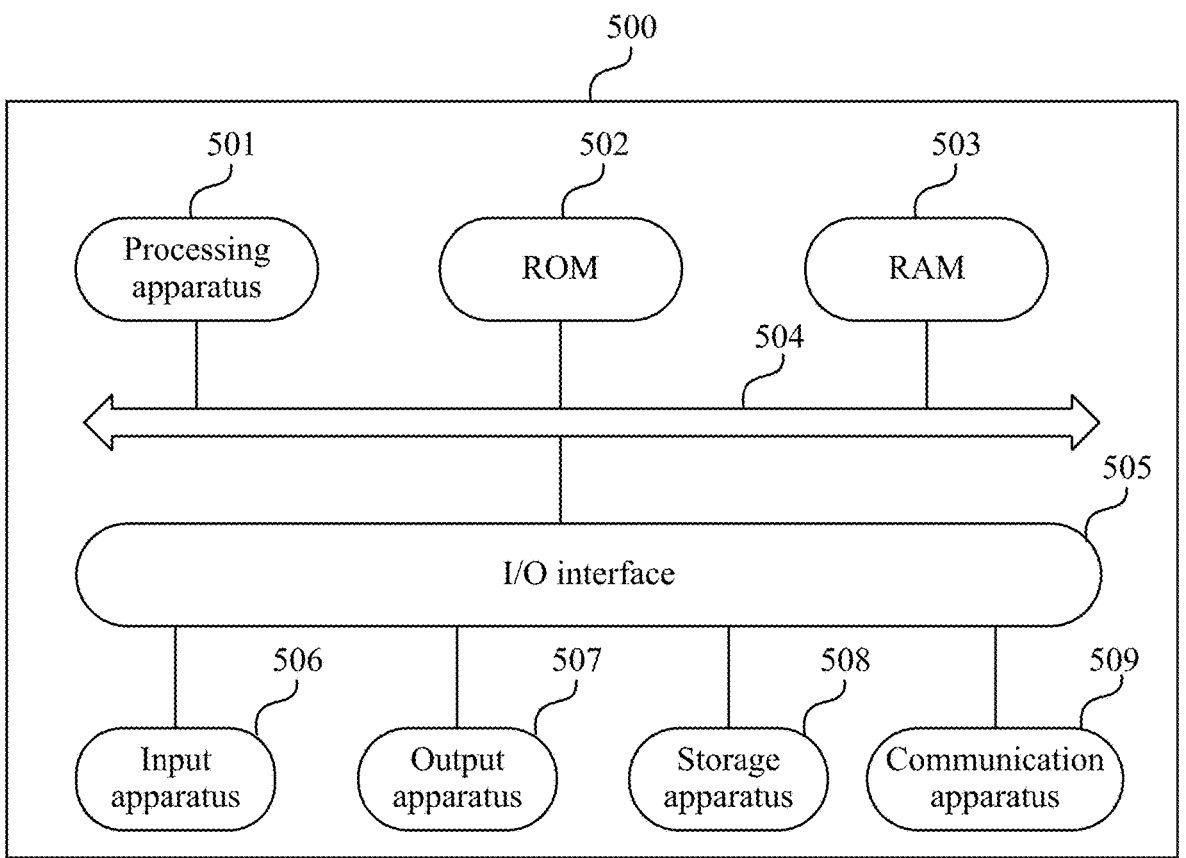
FIG. 11 is a structure diagram of an electronic device according to an embodiment of the present disclosure.

FIG. 11 is a structure diagram of an electronic device according to an embodiment of the present disclosure. FIG. 11 is a diagram illustrating the structure of an electronic device (for example, a terminal device or server in FIG. 11) 500 for implementing embodiments of the present disclosure. The terminal device of the embodiment of the present disclosure may include, but is not limited to, a mobile terminal such as a mobile phone, a laptop, a digital broadcast receiver, a personal digital assistant (PDA), a portable Android device (PAD), a portable media player (PMP), or an in-vehicle terminal (such as an in-vehicle navigation terminal); or a stationary terminal such as a digital television (TV) or a desktop computer. The electronic device shown in FIG. 11 is an example and is not intended to limit the function and use range of this embodiment of the present disclosure.

As shown in FIG. 11, the electronic device 500 may include a processing apparatus 501 (such as a central processing unit and a graphics processing unit). The processing apparatus 501 may execute various types of appropriate operations and processing based on a program stored in a read-only memory (ROM) 502 or a program loaded from a storage apparatus 508 to a random-access memory (RAM) 503. Various programs and data required for the operation of the electronic device 500 are also stored in the RAM 503. The processing apparatus 501, the ROM 502 and the RAM 503 are connected to each other through a bus 504. An input/output (I/O) interface 505 is also connected to the bus 504.

Generally, the following apparatuses may be connected to the I/O interface 505: an input apparatus 506 such as a touch screen, a touchpad, a keyboard, a mouse, a camera, a microphone, an accelerometer, or a gyroscope; an output apparatus 507 such as a liquid crystal display (LCD), a speaker, or a vibrator; the storage apparatus 508 such as a magnetic tape or a hard disk; and a communication apparatus 509. The communication apparatus 509 may allow the electronic device 500 to perform wireless or wired communication with other devices to exchange data. Although FIG. 11 illustrates the electronic device 500 having various apparatuses, it is to be understood that not all of the apparatuses illustrated herein need to be implemented or present. Alternatively, more or fewer apparatuses may be implemented or present.

Particularly, according to embodiments of the present disclosure, the process described above with reference to a flowchart may be implemented as a computer software program. For example, a computer program product is included in the embodiment of the present disclosure. The computer program product includes a computer program carried on a non-transitory computer-readable medium. The computer program includes program codes for executing the methods shown in the flowcharts. In such an embodiment, the computer program may be downloaded from a network and installed through the communication apparatus 509, or may be installed from the storage apparatus 508, or may be installed from the ROM 502. When the computer program is executed by the processing apparatus 501, the preceding functions defined in the method of the embodiments of the present disclosure are executed.

The names of messages or information exchanged between apparatuses in embodiments of the present disclosure are illustrative and not to limit the scope of the messages or information.

The electronic device provided in the embodiment belongs to the same inventive concept as the information display methods provided in the preceding embodiments, and for the technical details not described in detail in the embodiment, reference may be made to the preceding embodiments, and the embodiment has the same beneficial effects as the preceding embodiments.

An embodiment of the present disclosure provides a computer storage medium storing a computer program which, when executed by a processor, implements the information display method provided in the preceding embodiments.

It is to be noted that the preceding computer-readable medium in the present disclosure may be a computer-readable signal medium or a computer-readable storage medium or any combination thereof. The computer-readable storage medium may be, but is not limited to, for example, an electronic, magnetic, optical, electromagnetic, infrared or semiconductor system, apparatus or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as part of a carrier, where computer-readable program codes are carried in the data signal. The data signal propagated in this manner may be in multiple forms and includes, but is not limited to, an electromagnetic signal, an optical signal or any suitable combination thereof. The computer-readable signal medium may also be any computer-readable medium except the computer-readable storage medium. The computer-readable signal medium may send, propagate, or transmit a program used by or used in conjunction with an instruction execution system, apparatus, or device. The program codes included on the computer-readable medium may be transmitted via any appropriate medium which includes, but is not limited to, a wire, an optical cable, a radio frequency (RF) or any appropriate combination thereof.

In some embodiments, clients and servers may communicate using any network protocol currently known or to be developed in the future, such as HyperText Transfer Protocol (HTTP), and may be interconnected with any form or medium of digital data communication (such as a communication network). Examples of the communication network include a local area network (LAN), a wide area network (WAN), an internet (such as the Internet) and a peer-to-peer network (such as an Ad-Hoc network), as well as any network currently known or to be developed in the future.

The preceding computer-readable medium may be included in the preceding electronic device or may exist alone without being assembled into the electronic device.

The computer-readable medium carries one or more programs which, when executed by the electronic device, cause the electronic device to perform the steps described below.

When a effect adding condition is satisfied, a effect present image is filled into a first display region of a shooting control.

Target display information of a second display region on the shooting control is determined according to the effect present image, and the second display region is displayed according to the target display information.

The first display region is different from the second display region, and the second display region surrounds the first display region.

Computer program codes for executing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. The program codes may be executed entirely on a user computer, executed partly on a user computer, executed as a stand-alone software package, executed partly on a user computer and partly on a remote computer, or executed entirely on a remote computer or a server. In the case related to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show the possible architecture, function and operation of the system, method and computer program product according to various embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which performs specified functions or operations or a combination of special-purpose hardware and computer instructions.

The units involved in the embodiments of the present disclosure may be implemented by software or hardware. The names of the units do not constitute a limitation on the units themselves. For example, a first acquisition unit may also be described as "a unit for acquiring at least two Internet protocol addresses".

The functions described above herein may be executed, at least partially, by one or more hardware logic components. For example, without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof.

According to one or more embodiments of the present disclosure, example one provides an information display method. The method includes steps described below.

When a effect adding condition is satisfied, a effect present image is filled into a first display region of a shooting control.

Target display information of a second display region on the shooting control is determined according to the effect present image, and the second display region is displayed according to the target display information.

The first display region is different from the second display region, and the second display region surrounds the first display region.

According to one or more embodiments of the present disclosure, example two provides an information display method, where the effect adding condition includes at least one of:

In an exemplary embodiment, it is detected that the shooting control is triggered.

It is detected that the effect present image on a display interface is triggered.

It is detected that present duration of a to-be-processed image reaches preset present duration.

It is detected that a present gesture of a target portion of a target object is consistent with a preset present gesture.

According to one or more embodiments of the present disclosure, example three provides an information display method. The method further includes steps described below.

In an exemplary embodiment, a target effect corresponding to the effect present image is loaded so as to render an acquired to-be-processed image based on the target effect.

According to one or more embodiments of the present disclosure, example four provides an information display method. The method further includes steps described below.

In an exemplary embodiment, in response to multiple to-be-selected effect present images are superimposed and displayed on a display interface, a to-be-selected effect present image disposed at an uppermost layer of the multiple to-be-selected effect present images on the display interface is taken as the effect present image; or in response to the multiple to-be-selected effect present images are tiled and displayed on the display interface, a first displayed to-be-selected effect present image of the multiple to-be-selected effect present images is taken as the effect present image according to a first preset direction; or a triggered to-be-selected effect present image of the plurality of to-be-selected effect present images is taken as the effect present image.

According to one or more embodiments of the present disclosure, example five provides an information display method. The method further includes steps described below.

In an exemplary embodiment, an original image of the first display region in the shooting control is updated based on the effect present image.

According to one or more embodiments of the present disclosure, example six provides an information display method. The method further includes steps described below.

In an exemplary embodiment, the target display information of the second display region on the shooting control is determined based on at least one color region in the effect present image.

According to one or more embodiments of the present disclosure, example seven provides an information display method. The method further includes steps described below.

In an exemplary embodiment, the target display information is determined according to the effect present image and a load state of a target effect corresponding to the effect present image.

According to one or more embodiments of the present disclosure, example eight provides an information display method. The method further includes steps described below.

In an exemplary embodiment, color information corresponding to a largest color region of the at least one color region is taken as the target display information.

According to one or more embodiments of the present disclosure, example nine provides an information display method. The method further includes steps described below.

In an exemplary embodiment, color information corresponding to a largest color region of the at least one color region is taken as first display information.

Color information corresponding to a second largest color region of the at least one color region is taken as dynamic display information in the second display region.

The target display information is determined based on the first display information and the dynamic display information so as to fill the second display region based on the first display information and take the dynamic display information as a scroll bar to traverse the second display region.

According to one or more embodiments of the present disclosure, example ten provides an information display method. The method further includes steps described below.

In an exemplary embodiment, the effect present image of the first display region is covered with a mask layer corresponding to the dynamic display information according to a preset transparency.

According to one or more embodiments of the present disclosure, example eleven provides an information display method. The method further includes steps described below.

In an exemplary embodiment, in response to an operation of removing the effect present image from the first display region being detected, a to-be-selected effect present image to be moved into the first display region is determined.

To-be-updated target display information of the to-be-selected effect present image is determined so as to update the target display information of the second display region based on the to-be-updated target display information when a coincidence degree between the to-be-selected effect present image and the first display region reaches a preset coincidence degree threshold.

According to one or more embodiments of the present disclosure, example twelve provides an information display method. The method further includes steps described below.

In an exemplary embodiment, in response to the coincidence degree between the first display region and the to-be-selected effect present image not reaching the preset coincidence degree threshold, distance information between the to-be-selected effect present image and the second display region and distance information between the effect present image and the second display region is determined.

A superposition ratio between the to-be-updated target display information and the target display information is determined based on the distance information between the to-be-selected effect present image and the second display region and the distance information between the effect present image and the second display region so as to display the second display region based on superposed target display information.

According to one or more embodiments of the present disclosure, example thirteen provides an information display method. The method further includes steps described below.

In an exemplary embodiment, in a case where multiple to-be-selected effect present images are provided, display sizes of the plurality of to-be-selected effect present images on both sides of the effect present image are successively reduced with the effect present image in the first display region as a center, and the multiple to-be-selected effect present images are stacked and displayed.

According to one or more embodiments of the present disclosure, example fourteen provides an information display method. In an exemplary embodiment, the first display region is a central circular surface region of the shooting control, and the second display region is a circular ring region surrounding the first display region.

According to one or more embodiments of the present disclosure, example fifteen provides an information display apparatus. The apparatus includes a first filling module and a second filling module.

The first filling module is configured to fill, when a effect adding condition is satisfied, a effect present image into a first display region of a shooting control.

The second filling module is configured to determine target display information of a second display region on the shooting control according to the effect present image, and display the second display region according to the target display information.

The first display region is different from the second display region, and the second display region surrounds the first display region.

The preceding description is merely illustrative of preferred embodiments of the present disclosure and the technical principles used therein. It is to be understood by those skilled in the art that the scope of disclosure involved in the present disclosure is not limited to the technical solutions formed by particular combinations of the preceding technical features and should also cover other technical solutions formed by any combinations of the preceding technical features or their equivalents without departing from the concept of the present disclosure, for example, technical solutions formed by the substitutions of the preceding features with the technical features (not limited to being) disclosed in the present disclosure and having similar functions.

Additionally, although operations are depicted in a particular order, this should not be construed as that these operations are required to be performed in the particular order shown or in a sequential order. In a certain environment, multitasking and parallel processing may be advantageous. Similarly, although several specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

Although the subject matter is described in the language specific to structural features and/or methodological logic acts, it is to be understood that the subject matter defined in the appended claims is not necessarily limited to the specific features or acts described above. Conversely, the particular features and acts described above are merely example forms for implementing the claims.

What is claimed is:

1. An information display method, comprising:
   in response to an effect adding condition being satisfied, filling an effect present image into a first display region of a shooting control, wherein the effect present image is an effect preview image of a target effect; and
   determining target display information of a second display region on the shooting control according to the effect present image, and displaying the second display region according to the target display information;

wherein the first display region is different from the second display region, and the second display region surrounds the first display region, wherein in a process of filling the effect present image into the first display region of the shooting control, further comprising:

loading a target effect corresponding to the effect present image so as to render an acquired to-be-processed image based on the target effect, and wherein determining the target display information of the second display region on the shooting control according to the effect present image comprises:

determining the target display information according to the effect present image and a load state of a target effect corresponding to the effect present image.

2. The method of claim 1, wherein the effect adding condition comprises at least one of:

the shooting control being triggered;

the effect present image on a display interface being triggered;

a present duration of a to-be-processed image reaching a preset present duration; or a present gesture of a target portion of a target object being consistent with a preset present gesture.

3. The method of claim 1, before loading the target effect corresponding to the effect present image, further comprising:

in response to a plurality of to-be-selected effect present images being superimposed and displayed on a display interface, taking a to-be-selected effect present image disposed at an uppermost layer of the plurality of to-be-selected effect present images on the display interface, as the effect present image; or in response to the plurality of to-be-selected effect present images being tiled and displayed on the display interface, taking a first displayed to-be-selected effect present image of the plurality of to-be-selected effect present images according to a first preset direction, as the effect present image; or taking a triggered to-be-selected effect present image of the plurality of to-be-selected effect present images, as the effect present image.

4. The method of claim 1, wherein filling the effect present image into the first display region of the shooting control comprises:

updating an original image of the first display region in the shooting control based on the effect present image.

5. The method of claim 1, wherein determining the target display information of the second display region on the shooting control according to the effect present image comprises:

determining the target display information of the second display region on the shooting control according to at least one color region in the effect present image.

6. The method of claim 1, wherein the load state comprises a load completion state, and determining the target display information according to the effect present image and the load state of the target effect comprises:

taking color information corresponding to the largest color region of at least one color region in the effect present image, as the target display information.

7. The method of claim 1, wherein the load state comprises a loading state, and determining the target display information according to the effect present image and the load state of the target effect comprises:

taking color information corresponding to the largest color region of at least one color region in the effect present image, as first display information;

taking color information corresponding to a second largest color region of the at least one color region as dynamic display information in the second display region; and determining the target display information based on the first display information and the dynamic display information so as to fill the second display region based on the first display information and taking the dynamic display information as a scroll bar to traverse the second display region.

8. The method of claim 7, further comprising:

covering the effect present image of the first display region with a mask layer corresponding to the dynamic display information according to a preset transparency.

9. The method of claim 1, further comprising:

in response to an operation of removing the effect present image from the first display region being detected, determining a to-be-selected effect present image to be moved into the first display region; and determining to-be-updated target display information of the to-be-selected effect present image, so as to update the target display information of the second display region based on the to-be-updated target display information when a coincidence degree between the to-be-selected effect present image and the first display region reaches a preset coincidence degree threshold.

10. The method of claim 9, further comprising:

in response to the coincidence degree between the first display region and the to-be-selected effect present image not reaching the preset coincidence degree threshold, determining distance information between the to-be-selected effect present image and the second display region and distance information between the effect present image and the second display region; and determining a superposition ratio between the to-be-updated target display information and the target display information based on the distance information between the to-be-selected effect present image and the second display region and the distance information between the effect present image and the second display region, so as to display the second display region based on superposed target display information.

11. The method of claim 1, further comprising:

in a case where a plurality of to-be-selected effect present images are provided, successively reducing display sizes of the plurality of to-be-selected effect present images on both sides of the effect present image with the effect present image in the first display region as a center, and stacking and displaying the plurality of to-be-selected effect present images.

12. The method of claim 1, wherein the first display region is a central circular surface region of the shooting control, and the second display region is a circular ring region surrounding the first display region.

13. An electronic device, comprising:

at least one processor; and a storage apparatus configured to store at least one program;

wherein the at least one program, when executed by the at least one processor, cause the at least one processor to:

in response to an effect adding condition being satisfied, fill an effect present image into a first display region of a shooting control, wherein the effect present image is an effect preview image of a target effect; and determine target display information of a second display region on the shooting control according to the effect present image, and display the second display region according to the target display information;

wherein the first display region is different from the second display region, and the second display region surrounds the first display region, wherein in a process of filling the effect present image into the first display region of the shooting control, the at least one program, when executed by the at least one processor, further causes the at least one processor to:

load a target effect corresponding to the effect present image so as to render an acquired to-be-processed image based on the target effect, and wherein the at least one program, when executed by the at least one processor, causes the at least one processor to determine the target display information of the second display region on the shooting control according to the effect present image, in the following manner:

determining the target display information according to the effect present image and a load state of a target effect corresponding to the effect present image.

14. The device of claim 13, wherein the effect adding condition comprises at least one of:

the shooting control being triggered;

the effect present image on a display interface being triggered;

present duration of a to-be-processed image reaching preset present duration; or a present gesture of a target portion of a target object being consistent with a preset present gesture.

15. The device of claim 13, before loading the target effect corresponding to the effect present image, the at least one program, when executed by the at least one processor, further causes the at least one processor to:

in response to a plurality of to-be-selected effect present images being superimposed and displayed on a display interface, take a to-be-selected effect present image disposed at an uppermost layer of the plurality of to-be-selected effect present images on the display interface, as the effect present image; or in response to the plurality of to-be-selected effect present images being tiled and displayed on the display interface, take a first displayed to-be-selected effect present image of the plurality of to-be-selected effect present images according to a first preset direction, as the effect present image; or take a triggered to-be-selected effect present image of the plurality of to-be-selected effect present images, as the effect present image.

16. The device of claim 13, wherein the at least one program, when executed by the at least one processor, cause the at least one processor to fill the effect present image into the first display region of the shooting control in the following manner:

updating an original image of the first display region in the shooting control based on the effect present image.

17. A non-transitory storage medium comprising computer-executable instructions which, when executed by a computer processor, causes the computer processor to:

in response to an effect adding condition being satisfied, fill an effect present image into a first display region of a shooting control, wherein the effect present image is an effect preview image of a target effect; and determine target display information of a second display region on the shooting control according to the effect present image, and display the second display region according to the target display information;

wherein the first display region is different from the second display region, and the second display region surrounds the first display region, wherein in a process of filling the effect present image into the first display region of the shooting control, the computer-executable instructions, when executed by the computer processor, further cause the computer processor to:

load a target effect corresponding to the effect present image so as to render an acquired to-be-processed image based on the target effect, and wherein the computer-executable instructions, when executed by the computer processor, cause the computer processor to determine the target display information of the second display region on the shooting control according to the effect present image, in the following manner:

determining the target display information according to the effect present image and a load state of a target effect corresponding to the effect present image.

* * * * *